Aug. 18, 1931.  G. A. BRAGG  1,819,833
GAS PURIFICATION PROCESS
Filed Dec. 31, 1927
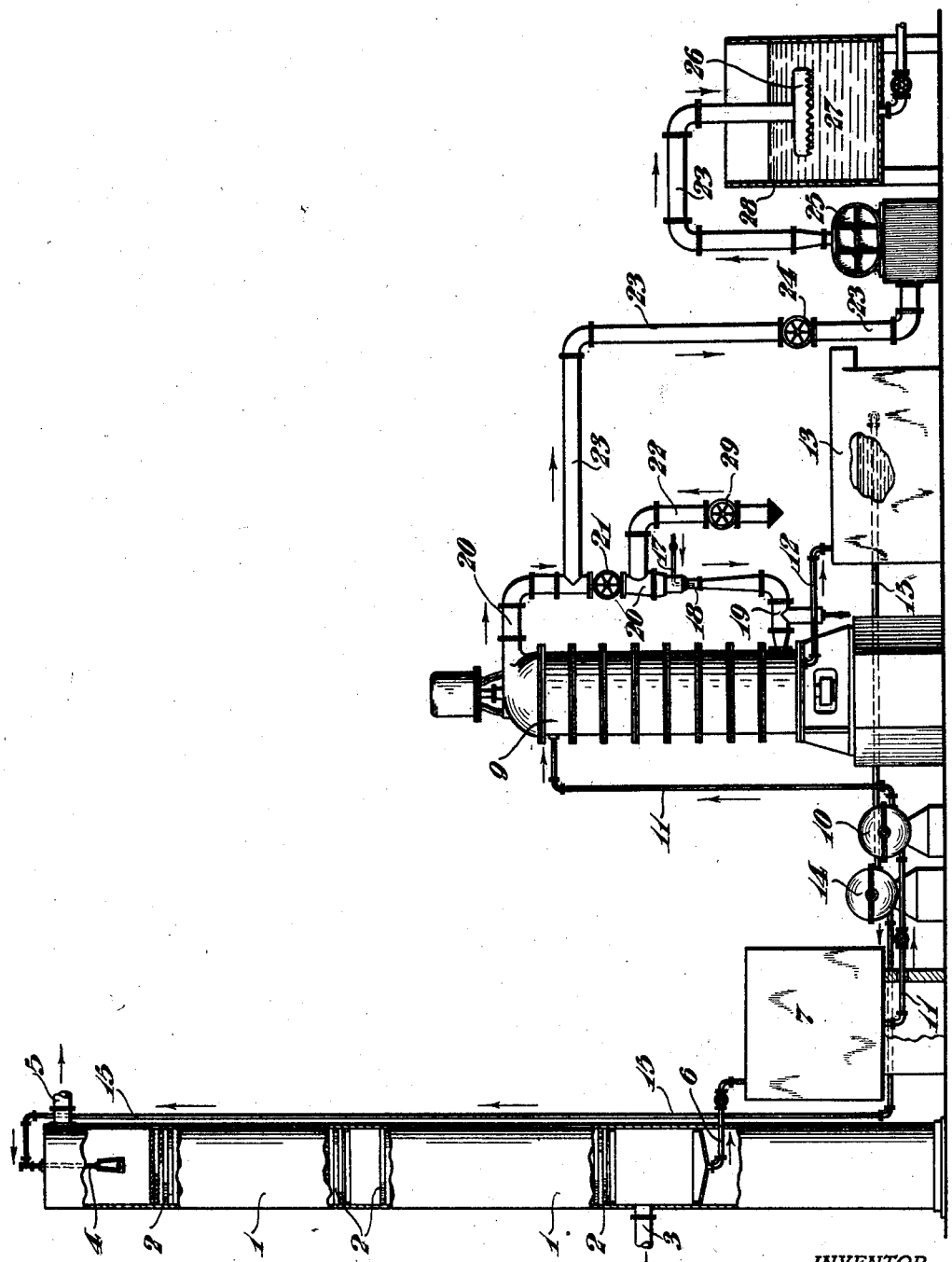
INVENTOR.
Gilbert A. Bragg
BY Jesse R. Langley
ATTORNEY.

Patented Aug. 18, 1931

1,819,833

UNITED STATES PATENT OFFICE

GILBERT A. BRAGG, OF PITTSBURGH, PENNSYLVANIA, ASSIGNOR TO THE KOPPERS COMPANY, A CORPORATION OF DELAWARE

GAS PURIFICATION PROCESS

Application filed December 31, 1927. Serial No. 243,855.

This invention relates to purification of gas, such as coal gas or water gas, from hydrogen sulphide, hydrogen cyanide, carbon dioxide and analogous impurities and more particularly to the process and apparatus wherein the gas is purified by contact with an absorbent liquid, the thereby fouled liquid being then actified or regenerated and returned for treatment of further quantities of gas. Such processes may be designated generally as "cyclic liquid gas purification processes".

In such processes, actification or regeneration of the fouled absorbent liquid is generally accomplished by aeration, although the nature of certain absorbents is such that any inert gas may be employed for their actification. In general, however, air is employed and, in many instances, air or some other gas containing free oxygen is essential to actification.

An object of my invention is to provide a gas purification process in which the cost of operation is materially reduced.

A second object of my invention is to provide a process and apparatus for gas purification in which the amount of air required for actification is materially reduced with certain resultant advantages, as will be shown hereinbelow.

A further object of my invention is to provide a gas purification process and apparatus that shall be free from noxious odor while in operation.

My invention has for further objects such other operative advantages and results as may hereinafter be found to obtain.

My invention has a particular application to a cyclic gas purification process in which ammonia and especially ammonia derived from the gas itself is employed as alkali for the absorbent liquid. For example, an ammoniacal gas containing acidic impurities is treated with an aqueous suspension of an iron compound such as iron oxide, under conditions favorable to the absorption of ammonia. The resultant ammoniacal suspension absorbs hydrogen sulphide probably as ammonium hydrosulphide, which in turn reacts with the iron oxide forming iron sulphide. The sulphided liquid is then removed from the gas and is aerated in such manner as to oxidize the iron sulphide back into the form of iron oxide, thus liberating in elemental form the sulphur removed from the gas.

Ordinarily in this specific process it is necessary to employ a volume of air for actification equivalent to about 45% of the gas purified. In the actification stage, this air liberates ammonia from the absorbent liquid in a roughly proportionate amount. That is, about half of the ammonia originally present in the gas is transferred to the liquid and again transferred to the air used for actification. As this ammoniacal air could not well be released on account of its noxious character, it thus became necessary, in the prior art, to treat a large amount of air to remove a correspondingly large amount of ammonia therefrom before the air could be released. This was both objectionable and expensive.

In the process of my invention, I avoid this difficulty and expense by recirculating the air or other gas for actification in a closed system. In order to prevent undue reduction of the oxygen content or in order to prevent an unduly high concentration of noxious constituents in the recirculated gas with resultant loss of actification efficiency, I refresh the recirculated air preferably continuously with a relatively small amount of fresh air and withdraw from the system a substantially equal amount of the recirculated air or gas and treat this air or gas for removal of ammonia before releasing it into the atmosphere.

It will be seen from the above that I provide a process and apparatus wherein only a small amount of air need be treated for the removal of only a small portion of the ammonia originally present in the gas and that the ammonia content of the gas is lowered to only a relatively small degree.

In order that my invention may be clearly set forth and understood, I now describe, with reference to the accompanying drawing, the preferred form and manner in which my invention is practiced and embodied.

In the drawing, the single figure is a view, partly in elevation and partly in vertical section, of apparatus for gas purification in accordance with the present invention.

Referring to the drawing, the absorption stage takes place in an absorber 1, which, in the present instance, is constituted of the usual type of gas-treating tower, the interior of which is provided with a plurality of spaced contact elements 2. The gas to be purified enters the lower portion of the tower 1 from a conduit 3, passes upward through the contact elements 2 in counter-current with a downwardly flowing stream of absorbent liquid that is introduced by a spray 4. The gas then passes out in purified form through an outlet pipe 5.

The absorbent liquid introduced by the spray 4 is, in this instance, originally an aqueous suspension of from one to two percent of iron oxide, but after repeated recirculation becomes nearly saturated with ammonia with respect to the gas being purified. Other well-known gas purification liquids, for example, an arsenical liquid, may be employed, however, and my invention is not limited to the use of any particular gas purification liquid, although its advantages are most apparent in connection with the use of liquids in which ammonia and particularly ammonia derived from the gas itself is employed as an alkaline absorbent agent.

The absorbent liquid passes downward through the contact elements 2 in counter-current with the gas and removes ammonia and impurities, such as hydrogen sulphide, therefrom. The thereby fouled liquid flows from the lower part of the tower 1 through a conduit 6 into a tank 7.

Also, in the process of my invention, I prefer to conduct the actification of the fouled absorbent liquid by recirculating a gas through it in a substantially closed system. It is necessary to employ actification apparatus of an enclosed type. In the present instance, the actification stage is carried out in a scrubber or actifier 9, which is of the well-known Feld type. The Feld washer is highly suitable in this connection but other enclosed actifiers may be employed, for example, the actifier described and claimed in the copending U. S. patent application of Gilbert E. Seil, Serial No. 107,523, filed May 7, 1926, and also assigned to The Koppers Company.

The fouled absorbent liquid is removed from the tank 7 by a pump 10 and passes through a conduit 11 into the upper part of the actifier 9. The liquid then passes downwardly through the successive sections of the actifier 9 in counter-current with an upward flow of air and is thereby regenerated for further use with liberation of elemental sulphur and with the loss of only a small amount of its ammonia content. The regenerated liquid flows from the bottom of the actifier 9 through a conduit 12 into a tank or sump 13, which serves in the capacity of both a storage tank and a station for the removal of the bulk of the sulphur from the liquid. This sulphur may be removed by decantation, skimming, flotation or in any other suitable manner. The regenerated liquid is removed from the tank 13 by a pump 14, passing through a conduit 15 and a spray 4 into the absorber 1 for treatment of further quantities of gas.

For recirculating air through the actifier 9, I provide any suitable impelling device, such as a steam jet 17 and orifice 18 or any suitable blower. By means of this device, air is caused to flow through a conduit 19 into the lower part of the actifier 9. The air passes upward through the actifier 9 and passes out of the actifier 9 through a conduit 20 having a valve 21 therein and again traverses the impelling device 18 and is thereby recirculated.

In the present instance, actification of the fouled gas purification liquid is effected by an oxidation reaction and a certain amount of the oxygen contained in the air is absorbed by the gas purification liquid. It is desirable to insure that the oxygen content of the recirculated air does not fall below the amount necessary for good actification. It is obvious that unless the recirculated air were refreshed in some manner, the oxygen content would decrease to a point inconsistent with good actification efficiency and might eventually be reduced to only a few percent.

In order to refresh the recirculated air, I provide an intake 22 having a valve 29. The intake 22 preferably communicates with the conduit 20 at a point between the valve 21 and the impelling device 18. I further provide an offtake 23 which communicates with the conduit 20 between the valve 21 and the actifier 9. The conduit 23 is provided with a valve 24 and communicates with a blower 25 and a distributing bell 26 that is immersed in a bath of sulphuric acid 27 within a suitable container 28.

By proper manipulation of the valves 21, 24 and 29 and under the action of the impelling device 18 and the blower 25, a small portion of the air recirculated through the actifier 9 is preferably continuously withdrawn through conduit 23 and is replaced by a substantially equivalent volume of fresh air taken in through the conduit 22. The air withdrawn through the conduit 23 is, of course, substantially saturated with respect to the ammonia in the absorbent liquid, which is removed therefrom in the bath 27 by reaction of the sulphuric acid forming ammonium sulphate. The latter may be added to the ammonium sulphate recovered from the gas in the usual saturators.

The amount of air withdrawn from the system will vary with individual instances and requirements, but will ordinarily be from about 5 to 15% of the recirculated air; that is, if the air were being recirculated through the impelling device 18 at a rate of, for example, fifty-five cubic feet per second, the air would be withdrawn through the conduit 23 at the rate of from about 2.5 to 7.5 cubic feet per second.

It will be seen that instead of treating a volume of air roughly equivalent to half the volume of the purified gas for the removal of a corresponding amount of ammonia, in the process of my invention it is necessary to treat a volume of air equivalent to only about 2.5 to 7.5% of the gas purified for the removal of a correspondingly small amount of ammonia. Moreover, since this amount of air may be treated for removal of ammonia contained therein by very simple means, it is not difficult to obtain operating conditions free from objectionable annoyance due to emission of ammonia from the purification apparatus.

My invention is not limited to the specific instance or instances hereinabove described by way of example but may be variously employed within the scope of the claims hereinafter made.

I claim as my invention:

1. The process of purifying gas from acidic impurities, which comprises continuously recirculating an ammoniacal liquid through a cycle comprising an absorption stage wherein the gas is purified by the liquid and an actification stage wherein the liquid is regenerated for further use by subjecting it to contact with a continuously recirculating body of gas, continuously refreshing said recirculated body of gas by withdrawing a portion thereof and replacing it with fresh gas, and treating said withdrawn portion of the gas to remove therefrom ammonia derived from the gas purification liquid.

2. The process of purifying gas from hydrogen sulphide and analogous impurities which comprises recirculating a liquid containing ammonia and an agent effective to retain said impurities through a cycle comprising an absorption stage wherein the gas is purified by the liquid, and an actification stage wherein the liquid is regenerated for further use with liberation of free sulphur by subjecting it to contact with a continuously recirculating body of oxygen-containing gas, refreshing said body of gas by withdrawing a portion thereof, and replacing said withdrawn portion by an equivalent amount of fresh gas, and treating said withdrawn portion for recovery of ammonia derived from the gas purification liquid.

In testimony whereof, I have hereunto subscribed my name this 29th day of December, 1927.

GILBERT A. BRAGG.